United States Patent [19]
Shigemitsu et al.

[11] Patent Number: 5,253,293
[45] Date of Patent: Oct. 12, 1993

[54] ADAPTIVE DATA CIPHERING/DECIPHERING APPARATUSES AND DATA COMMUNICATION SYSTEM USING THESE APPARATUSES

[75] Inventors: Mineo Shigemitsu; Toshikazu Miyasaka; Kenichi Matsumoto, all of Mitaka, Japan

[73] Assignee: Secom Co., Ltd., Tokyo, Japan

[21] Appl. No.: 828

[22] Filed: Jan. 5, 1993

Related U.S. Application Data

[63] Continuation of Ser. No. 499,337, Jun. 18, 1990, abandoned.

[30] Foreign Application Priority Data

Jan. 23, 1988 [JP] Japan .................................. 63-11858
Nov. 16, 1988 [JP] Japan .................................. 63-287639

[51] Int. Cl.⁵ .......................... H04L 9/28; H04L 9/30
[52] U.S. Cl. .......................................... 380/9; 380/18; 380/20; 380/30; 380/33; 380/49
[58] Field of Search ................... 380/9, 18, 20, 28–30, 380/33, 49, 50

[56] References Cited

U.S. PATENT DOCUMENTS

| | | | |
|---|---|---|---|
| 4,091,423 | 5/1978 | Branscome | 380/18 |
| 4,368,357 | 1/1983 | Gurak | 380/2 |
| 4,514,761 | 4/1985 | Merrell et al. | 380/20 |
| 4,555,805 | 11/1985 | Talbot | 380/33 |
| 5,001,750 | 3/1991 | Kato et al. | 380/18 |

FOREIGN PATENT DOCUMENTS

| | | |
|---|---|---|
| 089632 | 9/1983 | European Pat. Off. |
| 1076732 | 3/1960 | Fed. Rep. of Germany |
| 62-216447 | 9/1987 | Japan |
| 63-86676 | 4/1988 | Japan |

Primary Examiner—Bernarr E. Gregory
Attorney, Agent, or Firm—Nikaido, Marmelstein, Murray & Oram

[57] ABSTRACT

A data communication system adaptable to a ciphered data communication includes a data transmission line (3) for transmitting ciphered or non-ciphered data between a data transmitting device and a data receiving device 11, a data transmitting device (1) for transmitting data, a data receiving device (5) for receiving data transmitted through the data transmitting device, a data ciphering apparatus (2) on the side of the data transmitting device, and a data deciphering apparatus (4) on the side of the data receiving device. The data ciphering apparatus including switching device (2A), line condition detector device (2B) control code monitor, scrambling device (2E), and drive control (2D). The line condition detector device, the control code monitor, and the scrambling device supply the transmission line through the switching device with ciphered data of the data from the data transmitting device. The data deciphering apparatus includes switching device (4A), line condition detector device (4B), control code monitor (4C), descramble device (4E), and drive control device (4D). The line condition detector device, the control code monitor, and the descrambling device, receive data and supply the data receiving device through the switching device with deciphered data of received data transmitted through the transmission line.

5 Claims, 14 Drawing Sheets

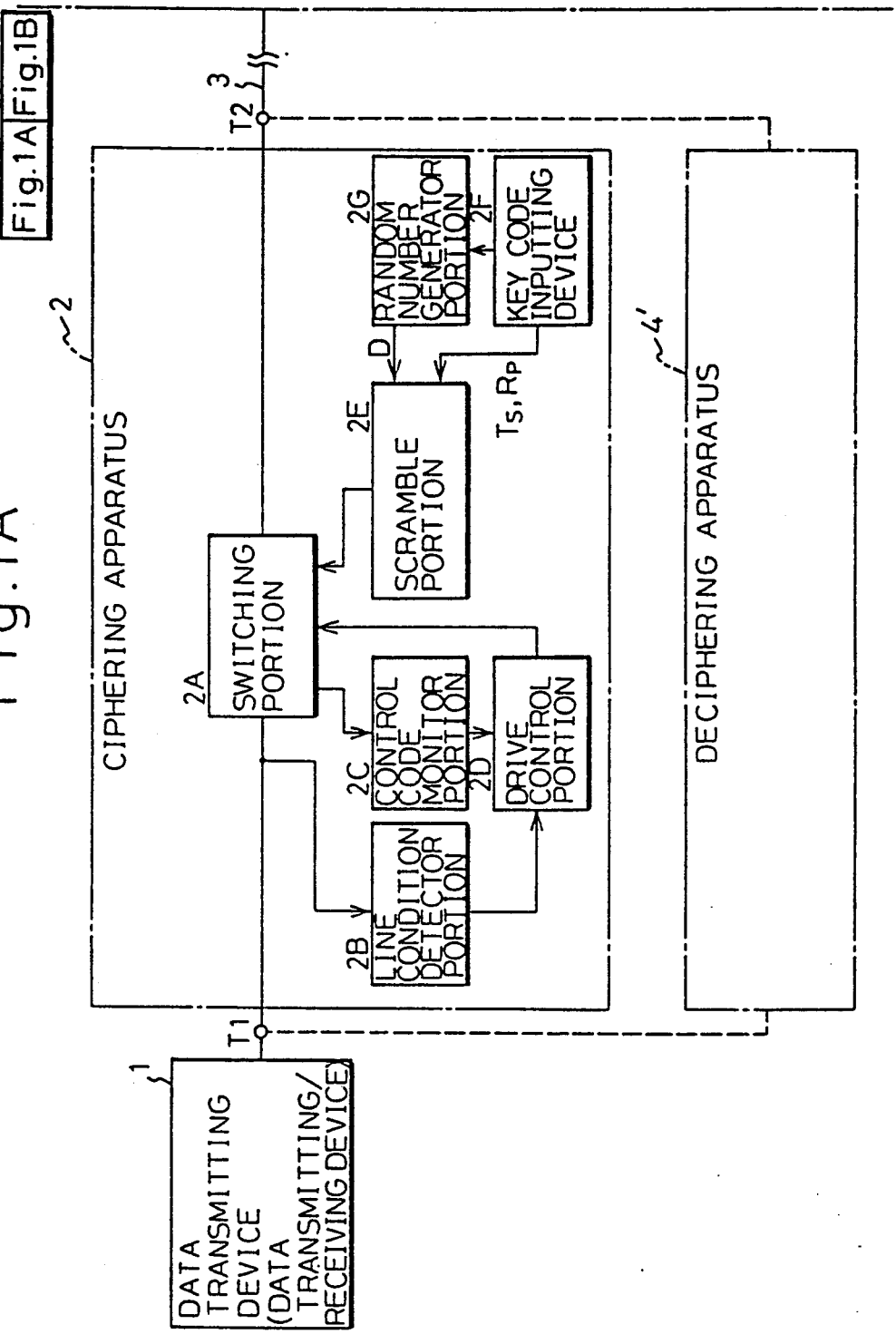

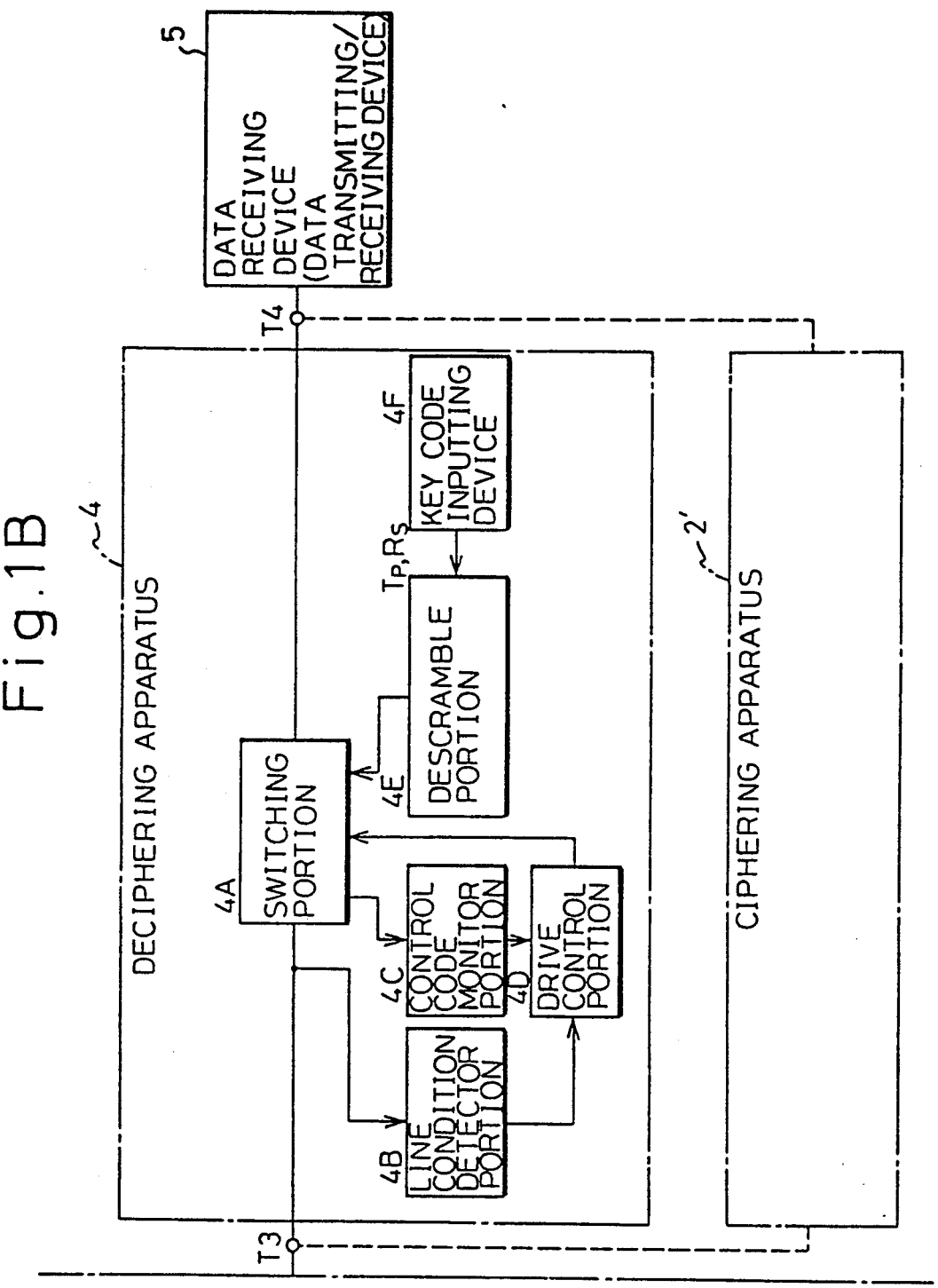

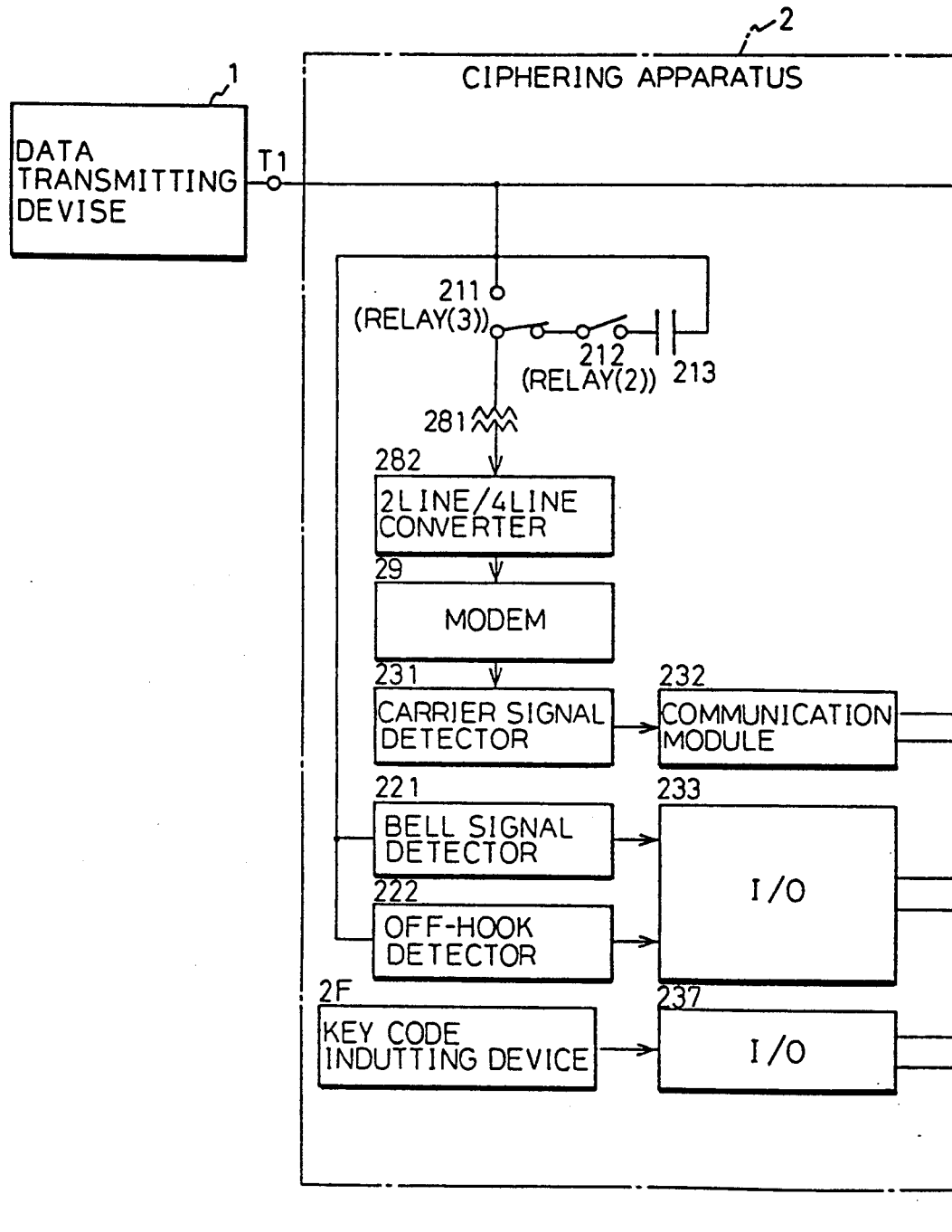

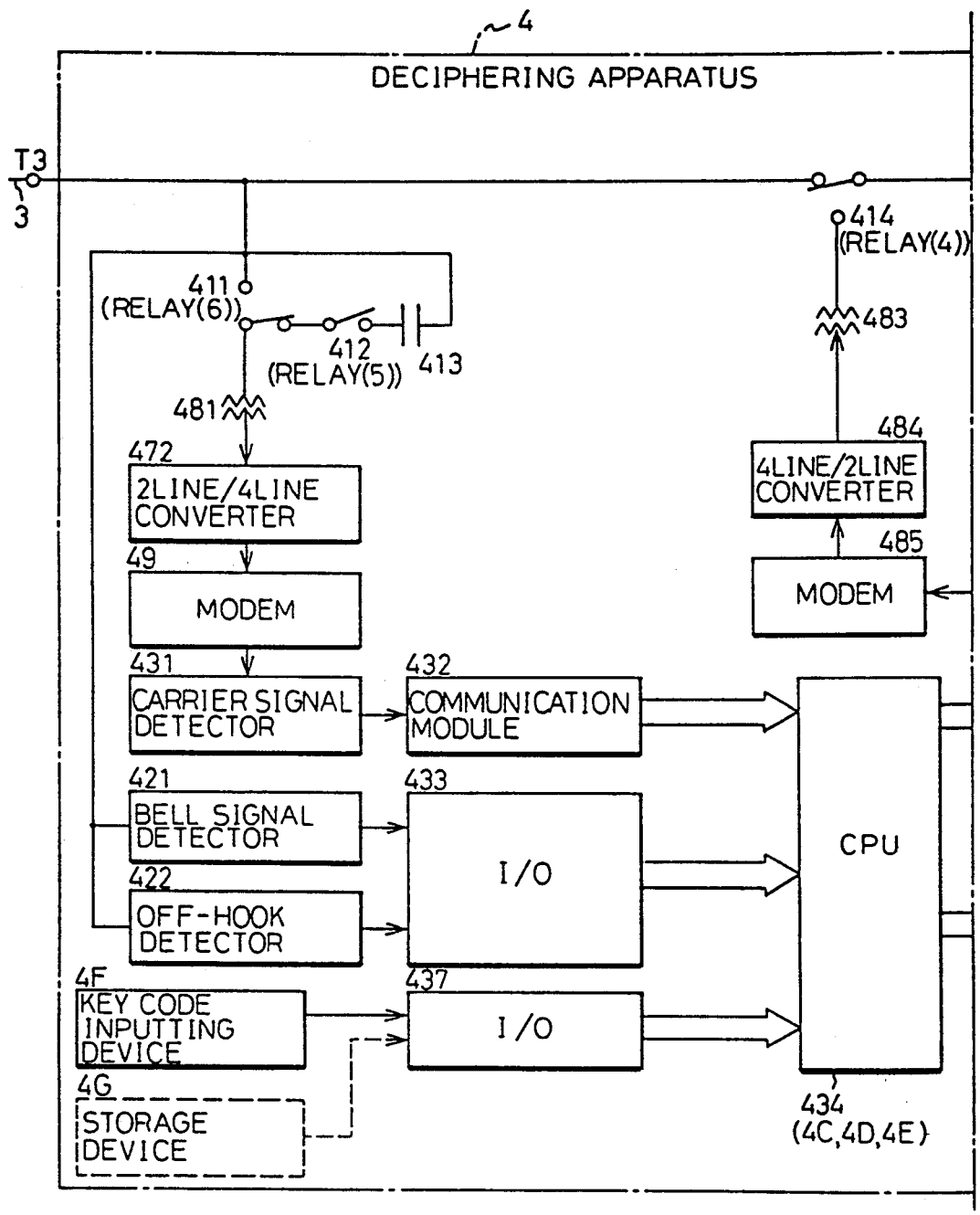

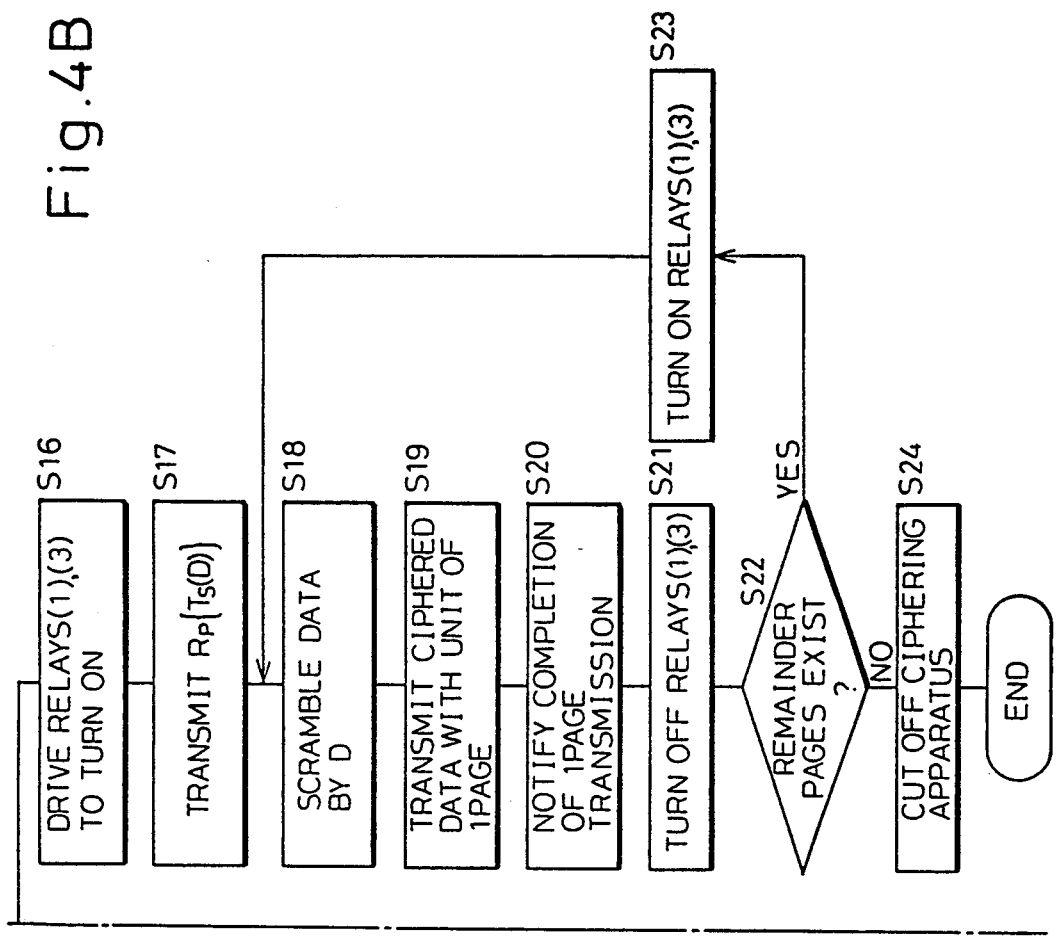

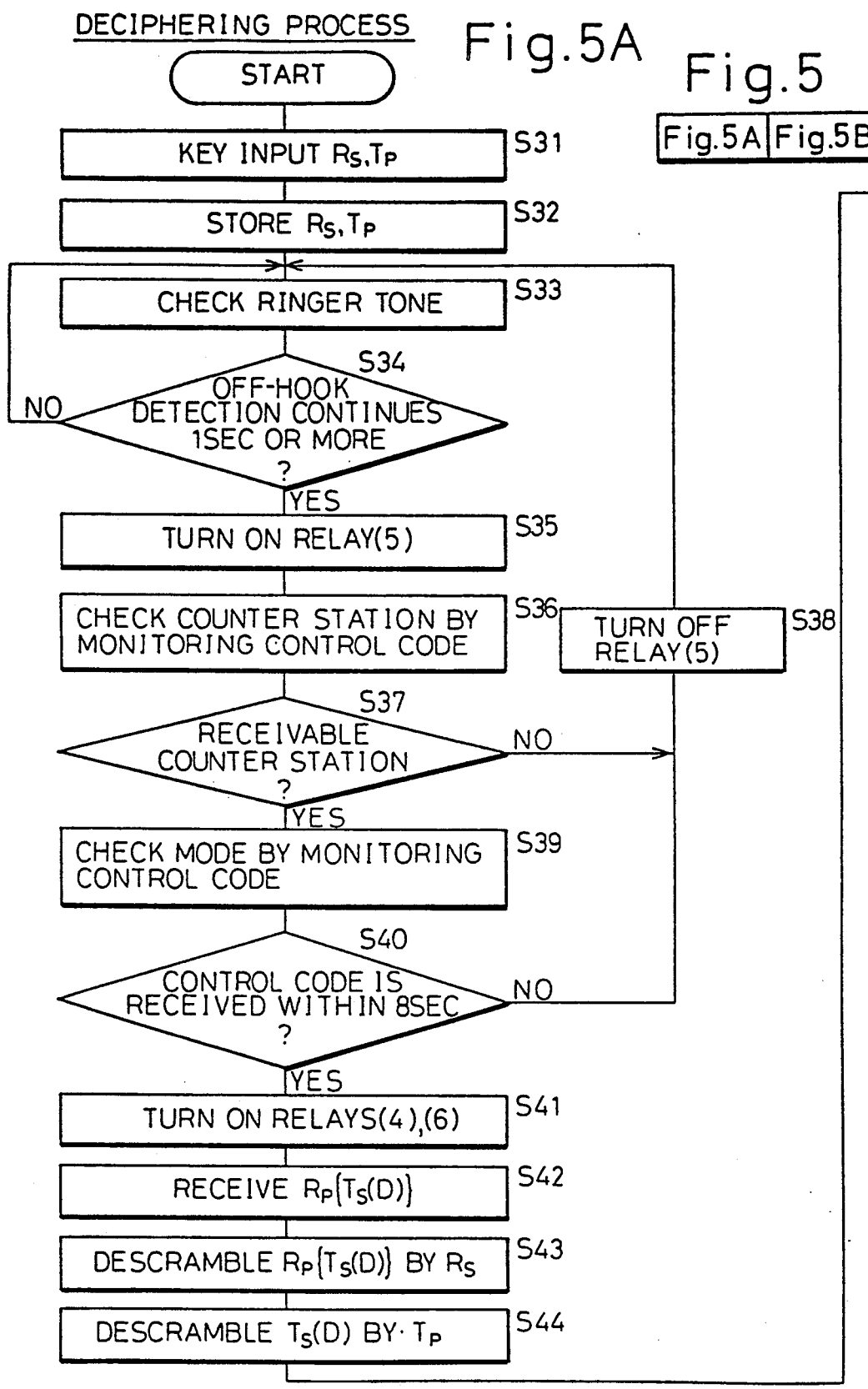

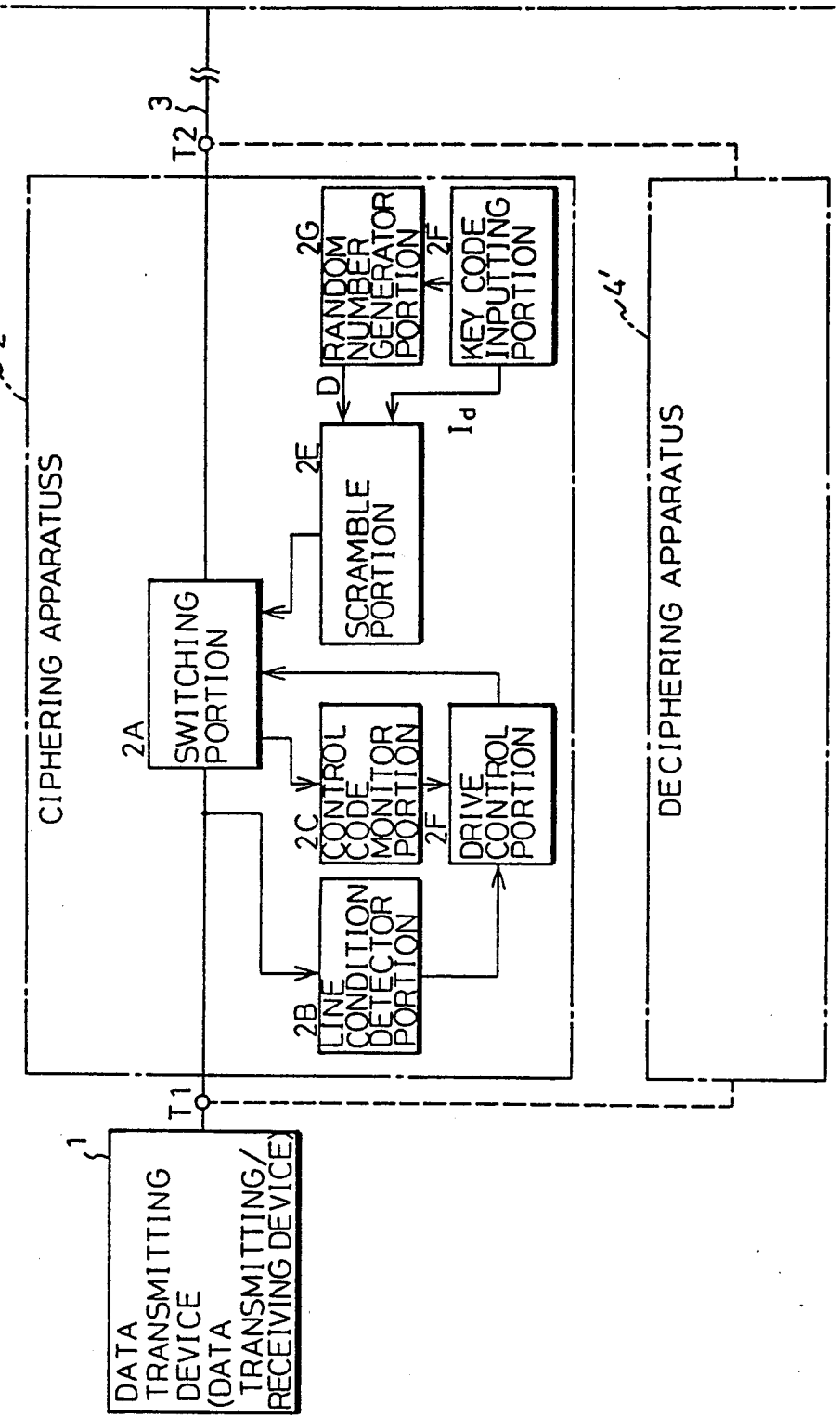

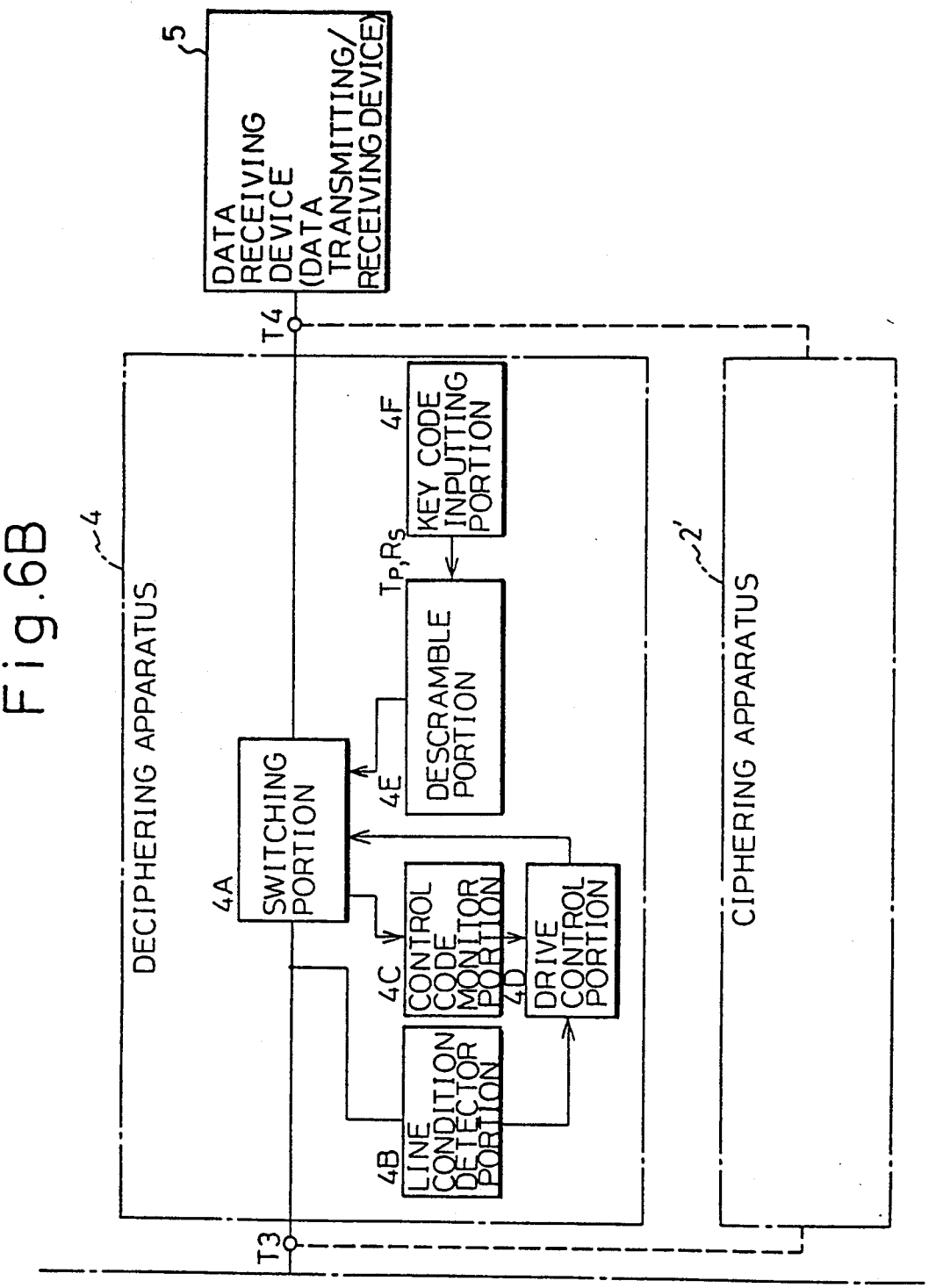

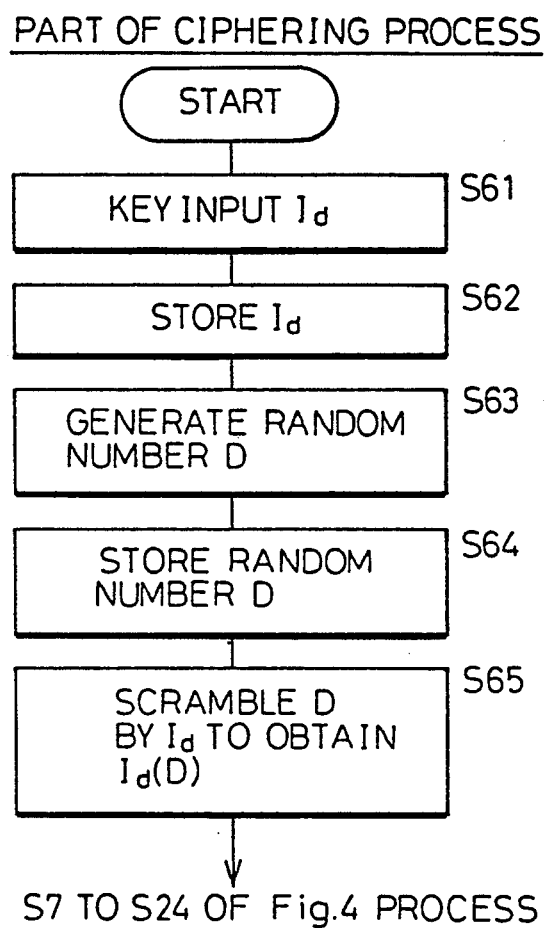

ADAPTIVE DATA CIPHERING/DECIPHERING APPARATUSES AND DATA COMMUNICATION SYSTEM USING THESE APPARATUSES

This application is a continuation of application Ser. No. 499,337, filed Jun. 18, 1990, now abandoned.

TECHNICAL FIELD

The present invention relates to adaptive data ciphering / deciphering apparatuses and a data communication system using these adaptive data ciphering / deciphering apparatuses. The system according to the present invention is used, for example, for a facsimile communication in which data is transmitted in the form of ciphered data.

BACKGROUND ART

A data transmitting device such as a facsimile device is able to data-communicate with a destination facsimile device through a telephone transmission line.

However, in a facsimile communication, if an erroneous telephone number for a destination facsimile device is called because of erroneous actuations or operations, data is caused to be transmitted to the facsimile device having such erroneous telephone number so that secret information of this data is inadvertently informed to a third party. Also, in a facsimile communication, there is a possibility of a wire tapping to obtain data from a public telephone transmission line. These situations of the inadvertent erroneous transmission of a secret information and the wire tapping to obtain data occur not only in the facsimile communication but also in personal computer communication.

Not limited to the case where a public transmission line is used, in a communication system using a local area network (LAN), there is a problem that, in a facsimile communication of secret information between specific parties, a secret may leak to a third party by an inadvertent erroneous transmission, that is, a erroneous transmission or a wire tapping.

With regard to the problem caused by the erroneous actuations or operations, no effective means has yet been found, since the problem is caused by erroneous human actuations. With regard to the problem caused by the wire tapping, a ciphering / deciphering means has been proposed in which a secret key system, such as the data encryption standard (DES) system, and the public key system, has been used.

In the secret key system, since it is necessary to transmit a ciphered secret key from a transmitting station to a receiving station, there is a problem that if the ciphered secret key is obtained by a third party by wire tapping the transmission line, the ciphered data can be easily deciphered by the third party.

In the public key system, the transmission of a key for deciphering is unnecessary. However, since the public key for deciphering is open to the public, there is a problem that, once the name of the transmitting party is known, the ciphered data can be easily deciphered by the receiving station. In these secret key systems, there is also a problem that the data processing capacity is required to be increased for enhancing the secret ensuring ability (security).

DISCLOSURE OF THE INVENTION

An object of the present invention is to provide an improved data communication system using either a public transmission line or a local transmission network such as a local area network in which the secrecy of communication is secured, the adaptation of the proposed apparatus is possible both for an existing communication system and a new system to be constructed, the proposed apparatus allows flexibility of operations, the cost of construction of the proposed apparatus is not expensive, and protection against the wire tapping of the transmission line is effectively achieved.

Another object of the present invention is to provide a data ciphering apparatus and a data deciphering apparatus suitable for the above aimed improved data communication system.

According to the present invention there is provided an apparatus for ciphering data for use in a data communication system including: switching means adapted to be connected between a data transmitting device and a transmission line for switching the connection between the data transmitting device and the transmission line to enable an insertion of the ciphering apparatus between the data transmitting device and the transmission line; line condition detector means connected with the switching means for detecting a call from the data transmitting device; control code monitor means connected with the switching means for monitoring communication control codes from the data transmitting means; scramble means connected with the switching means for ciphering data transmitted from the data transmitting device after the detection of the communication control codes by the control code monitor means; and drive control means, connected with the switching means and associated with the switching means, the line condition detector means, the control code monitor means, and the scrambling means, for supplying the transmission line through the switching means with ciphered data of the data from the data transmitting device.

According to the present invention there is also provided an apparatus for deciphering ciphered data for use in a data communication system including: switching means adapted to be connected between a transmission line and a data receiving device for switching the connection between the transmission line and the data receiving device to enable an insertion of the deciphering apparatus between the transmission line and the data receiving device; line condition detector means connected with the switching means for detecting a call transmitted through the transmission line; control code monitor means connected with the switching means for monitoring communication control codes through the transmission line; descramble means connected with the switching means for deciphering ciphered data transmitted through the transmission line after the detection of the communication control codes by the control code monitor means; and drive control means, connected with the switching means and associated with the switching means, the line condition detector means, the control code monitor means, and the descrambling means, for receiving data and supplying the data receiving device through the switching means with deciphered data of received data transmitted through the transmission line.

According to the present invention there is also provided a data communication system adaptable to a ciphered data communication including: a data transmission line for transmitting ciphered or non-ciphered data between a data transmitting device and a data receiving device; a data transmitting device for transmitting data;

a data receiving device for receiving data transmitted through the data transmitting device; a data ciphering apparatus on the side of the data transmitting device; and a data deciphering apparatus on the side of the data receiving device; the data ciphering device comprising: switching means between the data transmitting device and the data transmission line for switching the connection between the data transmitting device and the transmission line to enable an insertion of the ciphering apparatus between the data transmitting device and the transmission line; line condition detector means connected with the switching means for detecting a call from the data transmitting device; control code monitor means connected with the switching means for monitoring communication control codes from the data transmitting means; scrambling means connected with the switching means for ciphering the data transmitted from the data transmitting device after the detection of the communication control codes by the control code monitor means; and drive control means, connected with the switching means and associated with the switching means, the line condition detector means, the control code monitor means, and the scrambling means, for supplying the transmission line through the switching means with ciphered data of the data from the data transmitting device; the data deciphering device comprising: switching means adapted to be connected between the transmission line and the data receiving device for switching the connection between the transmission line and the data receiving device to enable an insertion of the deciphering apparatus between the transmission line and the data receiving device; line condition detector means connected with the switching means for detecting a call transmitted through the transmission line; control code monitor means connected with the switching means for monitoring communication control codes through the transmission line; descramble means connected with the switching means for deciphering ciphered data transmitted through the transmission line after the detection of the communication control codes by the control code monitor means; and drive control means, connected with the switching means and associated with the switching means, the line condition detector means, the control code monitor means, and the descrambling means, for receiving data and supplying the data receiving device through the switching means with deciphered data of received data transmitted through the transmission line.

BRIEF DESCRIPTION OF THE DRAWINGS

In the drawings,

FIGS. 1, 1A and 1B are a diagram of a data communication system having a data ciphering apparatus and a data deciphering apparatus according to an embodiment of the present invention;

FIGS. 2, 2A and 2B are a diagram showing the structure of a data ciphering apparatus according to an embodiment of the present invention;

FIGS. 3, 3A and 3B are a diagram showing the structure of a data deciphering apparatus according to an embodiment of the present invention;

FIGS. 4, 4A and 4B are a flow chart of the process of data ciphering in the apparatus of FIG. 2;

FIGS. 5, 5A and 5B are a flow chart of the process of data deciphering in the apparatus of FIG. 3;

FIGS. 6, 6A and 6B are a diagram of a data communication system having a data ciphering apparatus and a data deciphering apparatus according to another embodiment of the present invention; and FIGS. 7 and 8 are flow charts of portions of the processes of data ciphering and deciphering in the data ciphering and deciphering apparatuses of FIG. 6.

BEST MODE FOR CARRYING OUT THE INVENTION

A data communication system using data ciphering-/deciphering apparatuses according to an embodiment of the present invention is shown in FIG. 1. In the system of FIG. 1, a data ciphering apparatus and a data deciphering apparatus are applied to a facsimile communication system as a data communication system in which a facsimile transmitter as a data transmitting device 1 and a facsimile receiver as a data receiving device 2 are used and the data transmission and receipt are carried out through the telephone transmission line as a transmission line 3.

Figure 2B:
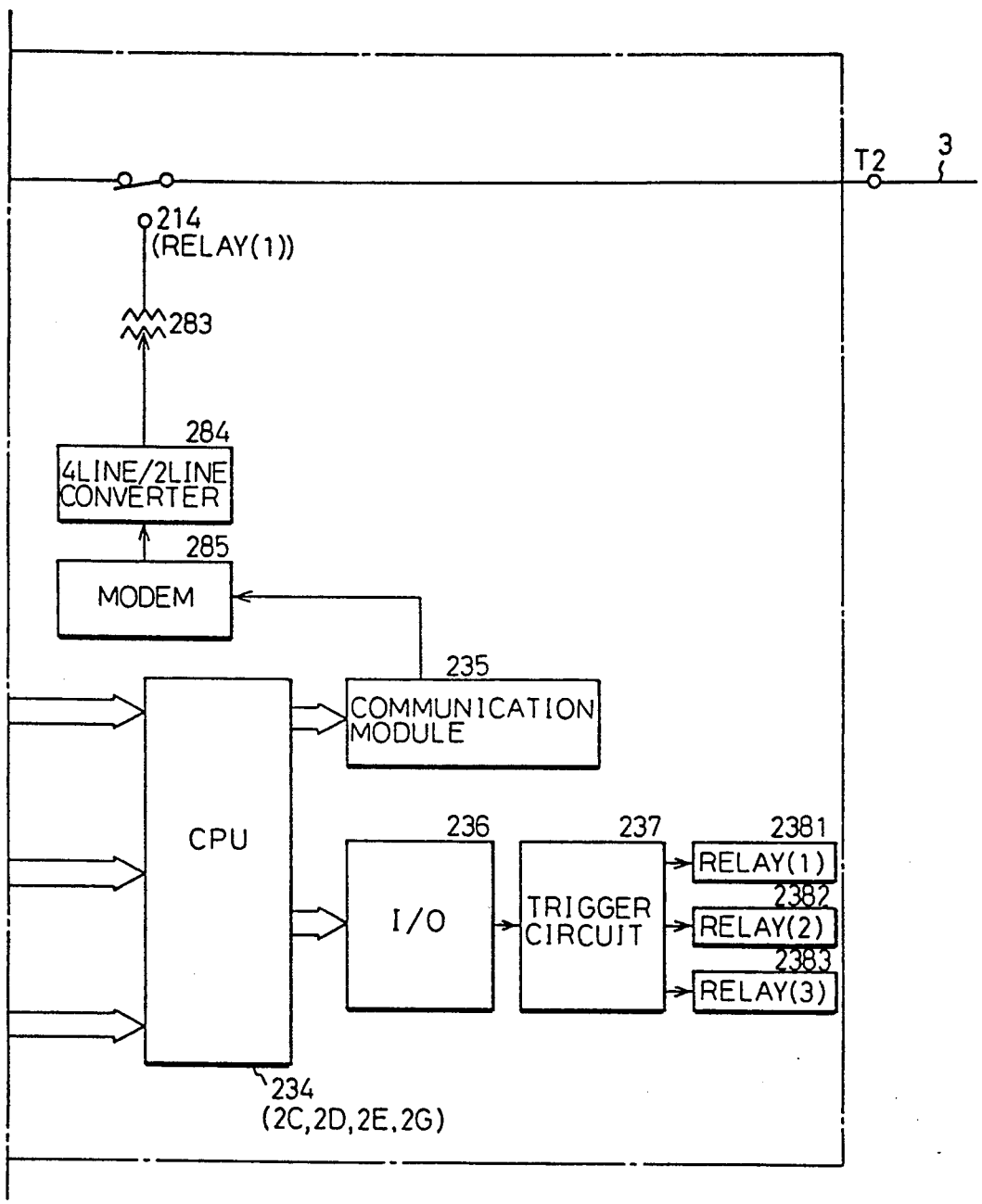
Figure 3B:
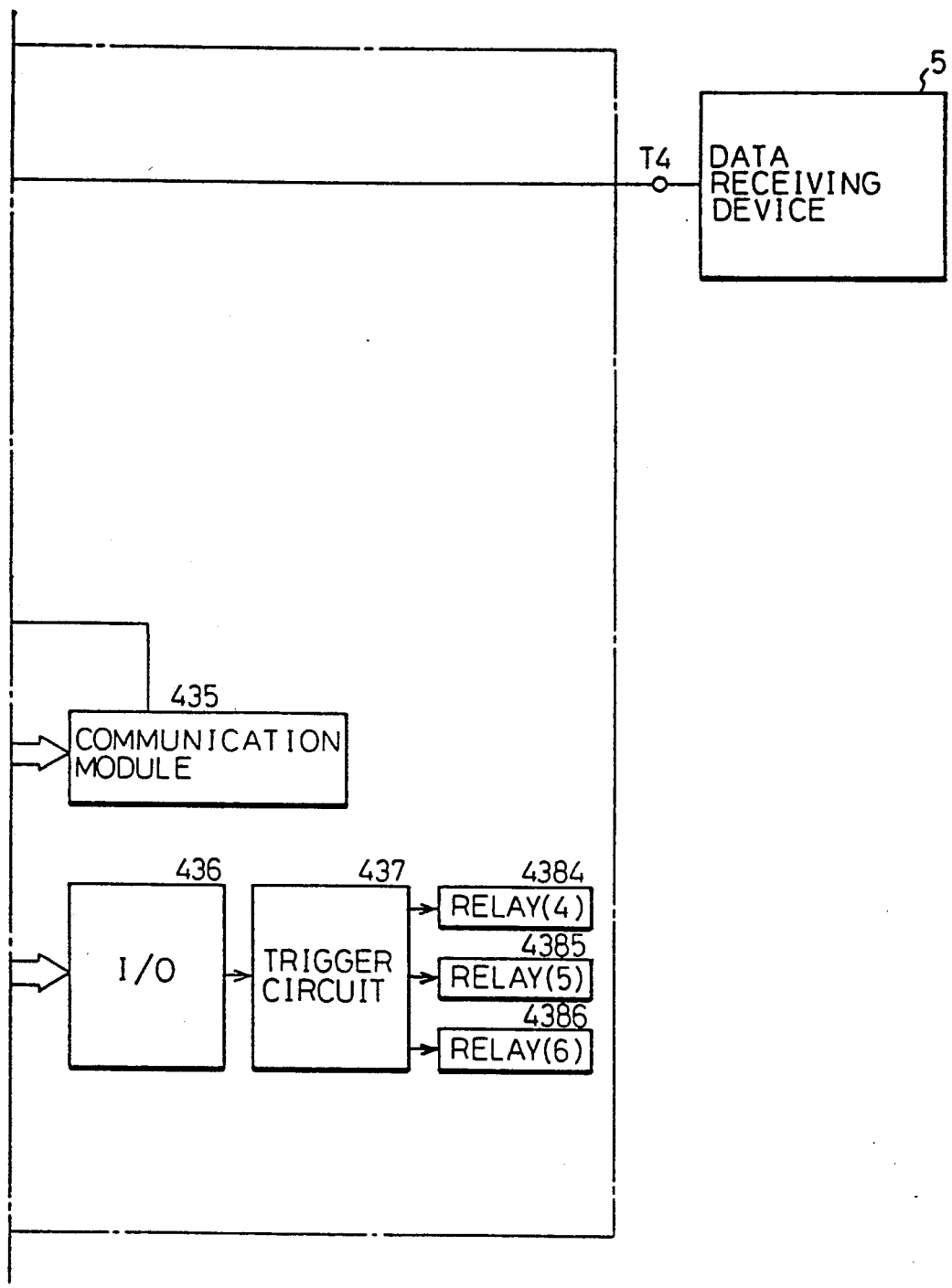

The structure of the data ciphering apparatus is shown in FIG. 2, and the structure of the data deciphering apparatus is shown in FIG. 3.

In the calling side, the data ciphering apparatus (facsimile scramble adapter apparatus) 2 is arranged between the data transmitting device 1 and the telephone transmission line 3. In the called side, the data deciphering apparatus (facsimile descramble adapter apparatus) 4 is arranged between the telephone transmission line 3 and the data receiving device 5. These data ciphering apparatus and the data deciphering apparatus are adapted to be connected with the existing facsimile communication system through the terminals T1, T2, T3, and T4. These data ciphering apparatus and the data deciphering apparatus are able to be disconnected from this existing facsimile communication system.

For simplifying the explanation, a "one-to-one" communication system is shown in FIG. 1. It should be noted, however, generally an "n-to-n" communication system is possible. In the case of "one to one" communication, since generally bi-directional communication is carried out, a parallel data ciphering apparatus and data deciphering apparatus or integrated data ciphering-/deciphering apparatus are arranged between the telephone transmission line and the data transmitting device or the data receiving device. However, in the description here, for easy understanding, the explanations are given for the calling side and the called side separately.

In the calling side, the data ciphering apparatus 2 includes a key code input device 2F of the ten-key type, and relay contacts 211, 212, and 214 and a capacitor 213 as a switching portion 2A. These relay contacts 211, 212, and 214 are relay contacts of relay (3), relay (2), and relay (1) driven by a trigger circuit 237. The capacitor 213 is for cutting of the direct current.

The data ciphering apparatus 2 also includes a bell signal detector circuit 221, and an off-hook signal detector circuit 222 as the line condition detector portion 2B and a central processor unit CPU 234 which will be explained later. The data ciphering apparatus 2 further includes a carrier detection circuit 231, asynchronous communication modules 232 and 235, an input/output interface 233 and 236, a trigger circuit 237, a central processor unit CPU 234, insulation transformers 281 and 283, 2 line/4 line conversion circuit 282, 4 line/2 line conversion circuit 284, and MODEMs 29 and 285, as the control code monitor portion 2C, the drive control portion 2D, the random number generator portion 2G, and the ciphering means (scramble portion) 2E.

In the called side, the data deciphering apparatus 4 has a structure similar to that of the data ciphering apparatus 2, except that a deciphering means is provided in place of the ciphering means in the data ciphering apparatus and no random number generator portion is provided.

The processes of operations of the calling side and the called side will now be explained below with reference to the flow charts of FIG. 4 and FIG. 5.

With regard to keys for ciphering, two kinds of keys are used, that is, an open key (public key) and a confidential key (secret key). A public key and a secret key constitute a pair of keys. The secret key is known only by the person to whom the secret key belongs. The ciphered data ciphered by a public key can be deciphered only by the secret key with which the public key constitutes a pair. Accordingly, by using the keys of this key system, a ciphered data transmitted from a specific transmitting party can be deciphered only by a designated specific receiving party, so that the secret ensuring ability (security) of communication is enhanced.

The secret key codes of the transmitter party and the receiver party are denoted as $T_s$ and $R_s$, and the public key codes of the transmitter party and the receiver party are represented as $T_p$ and $R_p$. Each of these secret key codes and public key codes is represented by a predetermined binary number.

The steps S1, S2, S31, and S32 are explained next.

The transmitting party informs the receiving party in advance of a transmission of a data, by telephone or the like, then, the transmitter party inputs its own secret key code $T_s$ and the public key code $R_p$ of the receiving party by the key code input device 2F (S1). The input secret key code $T_s$ and public code $R_p$ are stored temporarily in a random access memory RAM (not shown) (S2).

The receiving party inputs its own secret key code $R_s$ with which the public key code $R_p$ constitutes a pair and the public key code $T_p$ of the transmitting party with which the secret key code $T_s$ constitutes a pair (S31). The input secret key code $R_s$ and public key code $T_p$ are stored temporarily in a random access memory RAM (not shown) (S32).

The steps S3 and S4 are explained next.

The random number generator 2G is operated under the control of the CPU 234 to generate a random number D in response to the keys $T_s$ and $R_p$ supplied from the key code input device 2F. The random number D is a predetermined sequence of numerals chosen from 0 to 9. The generated random number D which is used as a ciphering key for the data is stored temporarily in a random access memory RAM (not shown) (S3, S4).

The steps S5, S6, and S7 are explained next.

The random number D is ciphered by the secret key code $T_s$. The code D ciphered by $T_s$ is expressed as $T_s(D)$. The ciphered code $T_s(D)$ is then ciphered by the public key code $R_p$. The code $T_s(D)$ ciphered by $R_p$ is expressed as $R_p\{T_s(D)\}$. The ciphered code $R_p\{T_s(D)\}$ is stored temporarily in a random access memory RAM (not shown) (S5, S6, S7).

The steps S8 and S9 are explained next.

When the transmitting party takes up the telephone receiver, that is, takes the telephone receiver off-hook, a telephone line loop is formed and the line voltage becomes 0 volt. In the ciphering apparatus 2, this off-hook action is detected by the off-hook signal detector circuit 222, and the detection signal is supplied through the I/O interface 233 to the CPU 234 (S8).

In the off-hook dialing pulse detection circuit 222 in the ciphering apparatus 2, it is detected whether or not an off-hook dialing pulse is received within, for example, 13 sec, and the result of the detection is supplied through the I/O interface 233 to the CPU 234 (S9).

When the detection of the off-hook dialing pulse does not continue for 1 sec or more, the process returns to step S8.

The steps S33 and S34 are explained next.

In the called side, the bell signal detection circuit 421 in the data deciphering apparatus detects the calling bell signal from the data transmitting device 1 in response to the call processing steps S8 and S9 (S33). After the detection of the calling bell signal, the continuation of the detection of the off-hook state for 1 sec or more is detected by the off-hook dialing pulse detection circuit 422 (S34). When the detection of the off-hook dialing pulse does not continue for 1 sec or more, the process returns to step S33.

The steps S10 and S35 are explained next.

Upon detecting the generation of a dialing pulse, the CPU 234 in the data ciphering apparatus 2 drives the relay (2) through the I/O interface 236 and the driver circuit 237 and the contact 212 of the relay (2) is closed (S10). In the called side, when the detection of the off-hook state continues for 1 sec or more, the CPU 434 of the data deciphering apparatus 4 drives the relay (5) through the I/O interface 436, and the trigger circuit 43, and the contact 412 of the relay (5) is closed (S35).

The steps S11, S12, S13, S36, S37, and S38 are explained next.

The monitoring of the control code is carried out by, for example, exchanging at a low frequency an acknowledgement signal between the data ciphering apparatus 2 and the data deciphering apparatus 4, so that an acknowledgement by the counter party is carried out, then the data ciphering apparatus 2 and the data deciphering apparatus 4 carry out the acknowledgement of the same mode or the receivable mode with each other (S12, S37).

If it is decided that the communication between the data ciphering apparatus 2 and the data deciphering apparatus 4 is impossible, that is, that the acknowledge signal cannot be received within a predetermined time or the acknowledge signals or the continuation periods are different, the relay (2) is deenergized through the trigger circuit 237 to open the contact 212 of the relay (2) (S13).

In a similar manner, in the called side, the relay (5) is driven through the trigger circuit 437 to open the contact 412 of the relay (5) (S38).

The steps S14 and S39 are explained next.

The control code between the data transmitting device 1 and the data receiving device 5 is monitored. The control code of the data transmitting device 1 is received through the capacitor 213, the relay contacts 212 and 211, the 2 line/4 line conversion circuit 282, the MODEM 29, the carrier signal detection circuit 231, and the communication module 232, and the received signal is signal-converted to be supplied to the CPU 234. The capacitor 213 cuts off the direct current, holds the current of the line, and prevents the hearing of the calling bell sound by the telephone receiver in the data transmitting device in the calling side from becoming impossible. For example, the speech transmission approval code (CFR code) is used for a control code of the data transmitting device 1, and this code is monitored by the CPU 234. In the data deciphering apparatus 4 in the called side, the monitoring of the control code is carried out by the CPU 434 through the transformer 481, 2 line/4 line conversion circuit 482, the MODEM 49, the carrier signal detection circuit 431, and the communication module 432 (S39).

The steps S15, S13, S40, and S38 are explained next.

In the data ciphering apparatus 2, the relay (2) is driven, and it is checked whether or not the control code is received within a predetermined time such as, for example, 8 sec after the closing of the contact of the relay (2) (S15). If it is checked as not received, the CPU 234 causes the relay (2) to be deenergized to turn off the contact 212 of the relay (2), and the process returns to step S13.

In the called side, in the data deciphering apparatus 4, the relay (5) is driven, and it is checked whether or not the control code is received within a predetermined time such as, for example, 8 sec after the closing of the contact 412 of the relay (5) (S40) If it is checked as not received, the CPU 434 causes the relay (5) to be deenergized to turn off the contact 412 of the relay (5), and the process returns to step S38 to again carry out the detection of the dialing.

During the above-described operations, a usual control process is carried out between the data transmitting device and the data receiving device through the telephone transmission line 3 independently from the data ciphering apparatus 2 and the data deciphering apparatus 4.

The steps S16 and S39 are explained next.

The CPU 234 in the data ciphering apparatus 2 drives the relay (1) and the relay (3) through the I/O interface 236, and causes the trigger circuit 237 to switch the contacts 214 and 211 of the relay (1) and relay (3) to close downwardly the contact 214 and close upwardly the contact 211 (S16), that is, the connection between the data transmitting device 1 and the telephone transmission line 3 is cut off, and a circuit forming the scramble portion 2E constituted by the contact 211 of the relay (3), the transformer 281, 2 line/4 line conversion circuit 282, the MODEM 29, the carrier detection circuit 231, the communication module 232, the CPU 234, the communication module 235, the MODEM 33, the 4 line/2 line conversion circuit 284, the transformer 283, and the contact 214 of the relay (1) is established.

In the called side, the CPU 434 in the data deciphering apparatus 4 drives the relay (4) and the relay (6) through the I/O interface 436 and causes the trigger circuit 437 to switch the contacts 414 and 411 of the relay (4) and relay (6) to close downwardly the contact 414 and close upwardly the contact 411 (S39). Accordingly, the connection between the telephone transmission line 3 and the data receiving device 5 is cut off, and a circuit forming the descramble portion 4E constituted by the contact 411 of the relay (6), the transformer 481, the 2 line/4 line conversion circuit 482, the MODEM 49, the carrier signal detection circuit 431, the communication module 432, the CPU 434, the communication module 485, the 4 line/2 line conversion circuit 484, the transformer 483, and the contact 414 of the relay (4) is established.

The steps S17, S42, S43, S44, and S45 are explained next.

In the calling side, the ciphering key code temporally stored in the RAM is read, and the read ciphering ciphering key code $R_p\{T_s(D)\}$ is transmitted to the data deciphering apparatus through the telephone transmission line 3 (S17).

In the called side, the above-transmitted ciphering key code is supplied to the CPU 434 through the contact 411 of the relay (6), the transformer 481, the 2 line/4 line conversion circuit 482, the MODEM 49, the carrier signal detection circuit 431, and the communication module 432 (S42). The CPU 434 causes the secret key code $R_s$ and the public key code $T_p$ stored in the RAM to be read. First, the deciphering of $R_p\{T_s(D)\}$ by the secret key code of the receiving party corresponding to the public key code $R_p$ is carried out. The deciphered data is expressed as $T_s(D)$ (S43).

Then, the deciphering of D from the ciphering key code $T_s(D)$ by the public key code $T_p$ of the transmitting party is carried out (S44). The obtained random number D is temporarily stored in the RAM (S45).

The steps S18, S19, S46, and S47 are explained next.

In the calling side, in the data ciphering apparatus 2, non-ciphered data transmitted from the data transmitting device 1 is received through the MODEM 29, the received data is scrambled by random number D under control of the CPU 234, and the thus ciphered data is transmitted to the transmission line 3 through the MODEM 33 (S18, S19).

In the called side, in the data deciphering apparatus 4, the ciphered data transmitted through the transmission line 3 is received by the CPU 434 through the MODEM 49, the received ciphered data is deciphered (descrambled), and the thus deciphered data which is the same as the data which was transmitted from the data transmitting device 1 is supplied to the data receiving device 5 through the MODEM 485 and the contact 414 of the relay (4) (S46, S47). The descrambling is the reverse operation of the scrambling. Thus, the data transmitted from the data transmitting device 1 is reproduced in the data receiving device 5.

The above-described ciphering and deciphering processes are carried out continuously for each page of the facsimile transmission.

The steps S20, S21, S22, S48, S49, and S50 are explained next.

In data communication such as a facsimile communication, a carrier signal of, for example, 75 ±20 ms exists between the completion of the transmission of one page of data and the transmission of the next control code. In the calling side, in the data ciphering apparatus, the carrier signal is detected by the carrier signal detection circuit 231, and in the called side, in the data deciphering apparatus, the carrier signal is detected by the carrier signal detection circuit 431. The detections of the carrier signal are informed to the CPU 234 and CPU 434 each of which detects the completion of the transmission of one page of data (S20, S48).

Upon detection of the completion of transmission of one page of data, the CPU 234 in the data ciphering apparatus 2 causes the relay (1) to deenergize to close upwardly the contact 214 of the relay (1) (S21). In a similar manner, the CPU 434 in the data deciphering apparatus 4 causes the relay (4) to deenergize to close upwardly the contact 414 of the relay (4) (S49).

Thus, a circuit constituted by the data transmitting device 1, the telephone transmission line 3, and the data receiving device 5 is established. At the same time, in the calling side, a circuit constituted by the data transmitting device 1, the MODEM 29, and the CPU 234 is established, and in the called side, a circuit constituted by the telephone transmission line 3, the MODEM 49, and the CPU 434 is established. Again, the monitoring of the control code between the data transmitting device and the data receiving device becomes possible. In this monitoring of the control code, each of the CPU 234 in the data ciphering apparatus and the CPU 434 in the data deciphering apparatus 4 effects monitoring of whether a multi-page signal, i.e., MPS code, is received or a cut-off instruction instruction signal, i.e., DCN code, is received (S22, S31). If a MPS code is received, the data communication of the next page is successively carried out, and accordingly, in the calling side, the process returns through step S23 to step S18, and in the called side, the process returns through step S41 to step S45.

The steps S24 and S52 are explained next.

When a cut-off instruction signal is received the state of the circuit is restored to the initial state shown in FIG. 2 and FIG. 3 to make the circuit ready for the next signal transmission as described below.

In the calling side, the CPU 234 causes the relay (2) and relay (3) to deenergize. Accordingly, the circuits constituting the scramble portion 2E and the control code monitor portion 2C are cut off from the circuit of the data transmitting device 1 and the telephone transmission line 3. However, the line condition detection portion 213 and the drive control portion 2D are able to operate.

In the called side, the CPU 434 causes the relay (5) and the relay (6) to deenergize. Accordingly, the circuits constituting the descramble portion 4E and the control code monitor portion 4C are cut off from the circuit of the telephone transmission line 3 and the data receiving device 5. However, the line condition detection portion 413 and the drive control portion 4D are able to operate.

In the above described process of operation of the system of FIG. 1, the communication of the ciphering key codes between the data ciphering apparatus and the data deciphering apparatus is carried out in step S17 and step S42. However, in order to reduce the time of the communication, the ciphering key codes may be incorporated with the control codes used in step S11 and S36.

A data communication system using data ciphering-/deciphering apparatuses according to a modified embodiment of the present invention is shown in FIG. 6 in which the ciphering of a random number D by a ciphering key code Id which is a specific code of the data deciphering apparatus connected between the transmission line 3 and the data receiving device 5, is carried out.

The structure of the system of FIG. 6 is similar to that of FIG. 1, except that the key code inputting device 4F is replaced by a storage device 4G. The storage device 4G stores a ciphering key code Id which is a specific code preliminarily determined for the data deciphering apparatus 4. The ciphering key code Id for the data deciphering apparatus 4 is preliminarily made open to the public in correspondence with the data receiving device 5.

Figure 8:
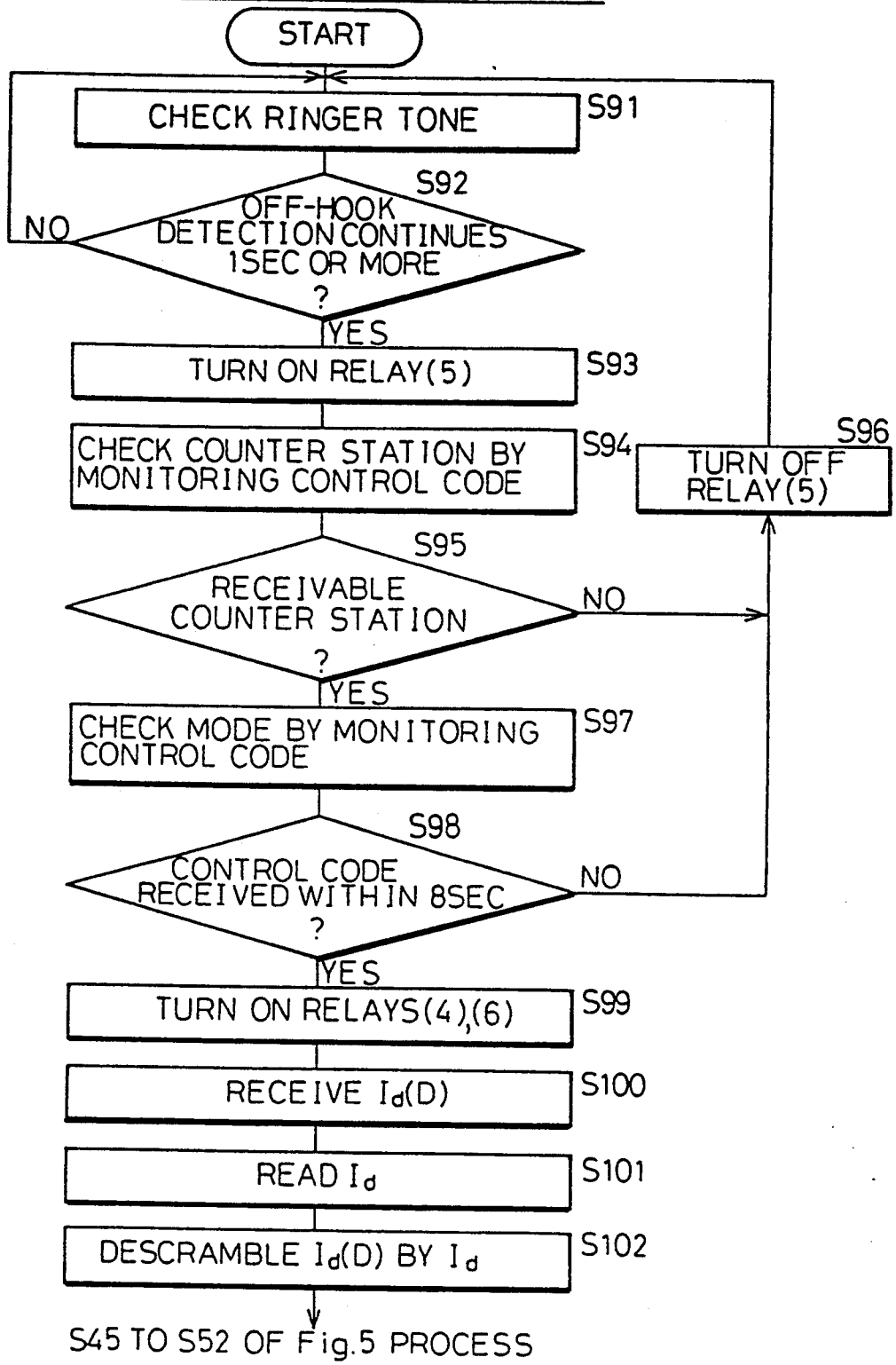

The processes of the operations of the calling side and the called side of the system of FIG. 6 will be explained with reference to the flow charts of FIG. 7 and FIG. 8. In the explanation, only the portions which are different from the flow charts of FIG. 4 and FIG. 5 will be explained.

The steps S61 and S62 are explained next.

The transmitting party inputs a ciphering key code Id of the receiving party through the key code inputting device 2F (S61). The input ciphering key code Id is stored temporarily in a RAM (not shown) (S62).

The steps S63 and S64 are explained next.

In response to the supply of the ciphering key code Id from the key code inputting device 2F, the random number generator portion 2G is operated under control of the CPU to generate a random number D (S63). The generated random number D which is used for a ciphering key code for the communication data is stored temporarily in a RAM (not shown) (S64).

The steps S65 and S66 are explained next.

The random number D is ciphered by the ciphering key code Id. The ciphered random number is expressed as $I_d(D)$ The ciphered random number $I_d(D)$ is stored temporarily in a RAM (not shown).

The steps S100, S101, S102, and S103 are explained next.

Figures 4, 4A:
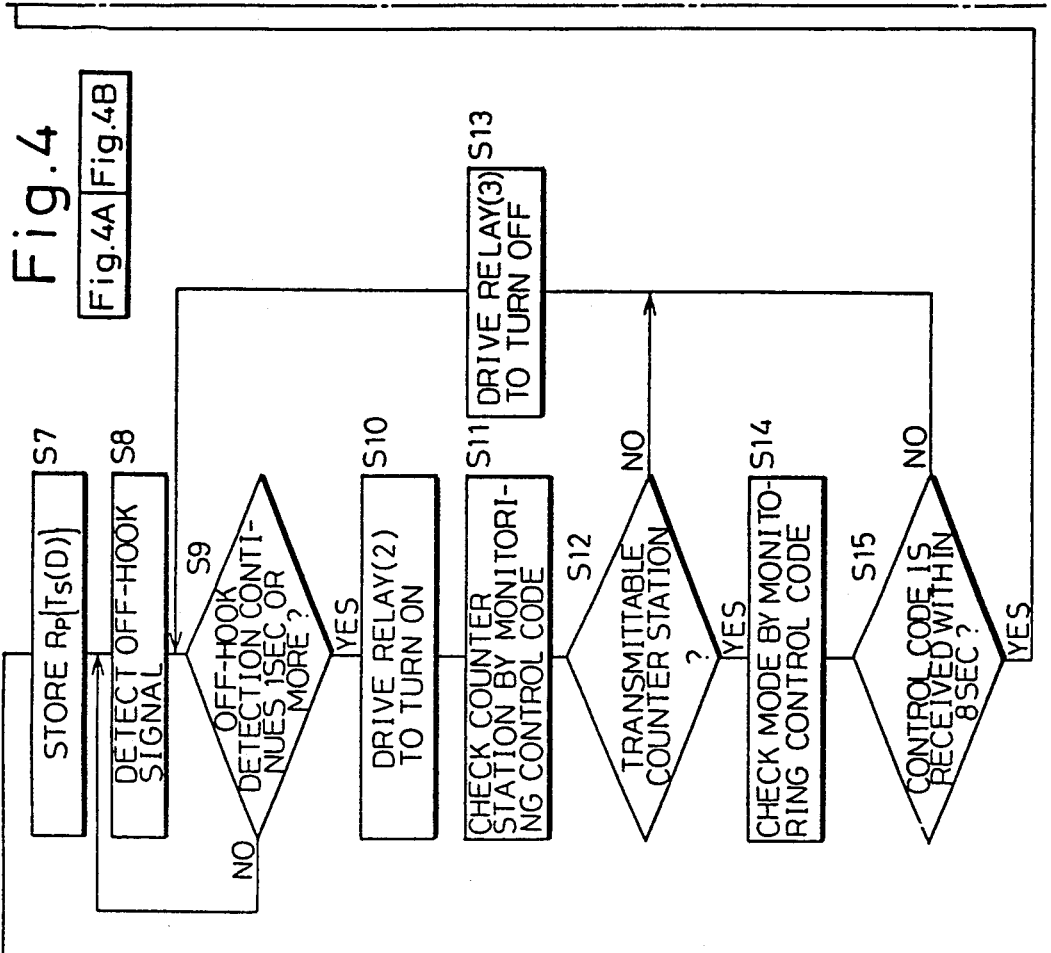
Figure 5B:
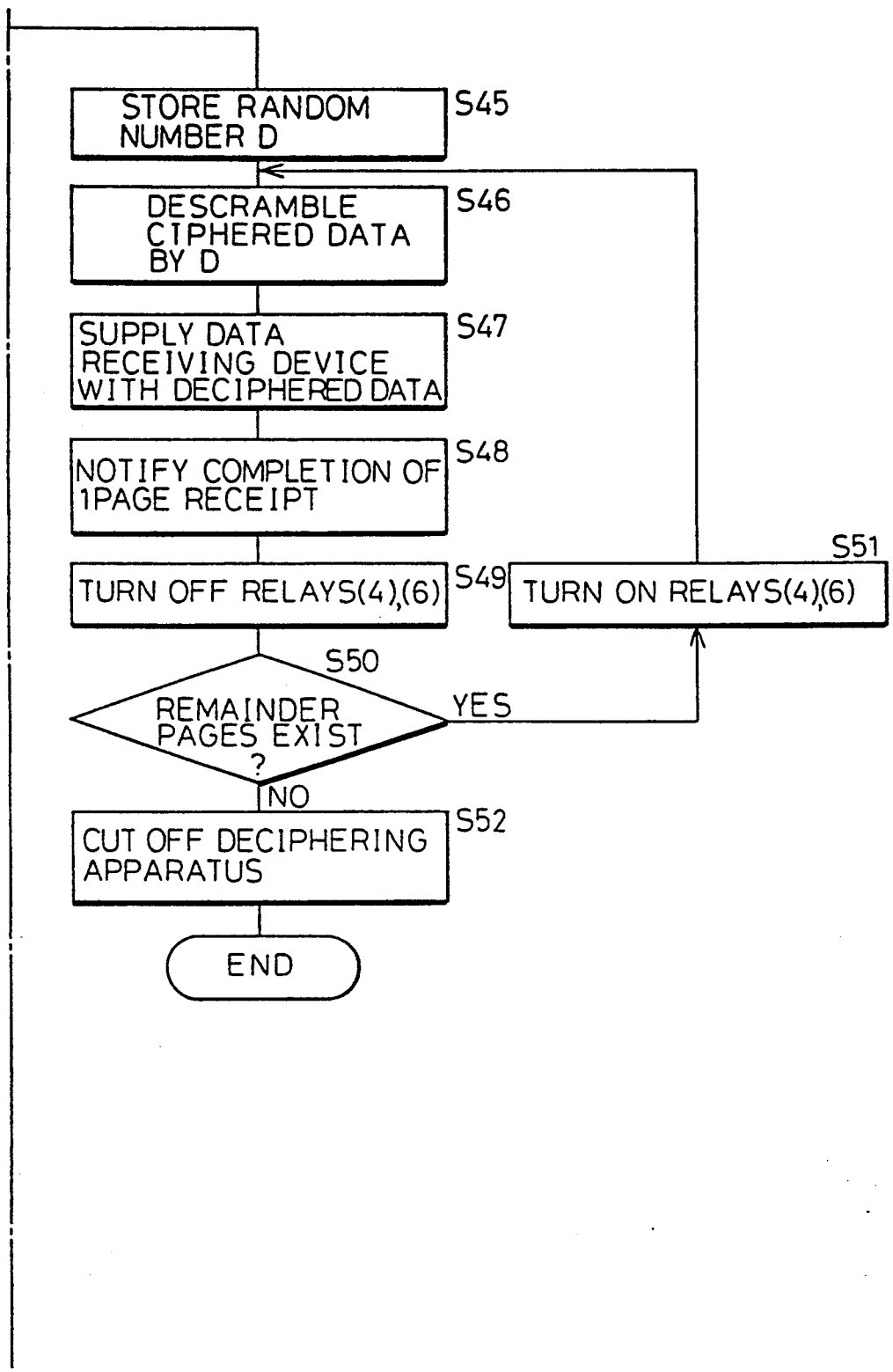

In the calling side, the ciphered key code temporarily stored in the RAM is read, and the read ciphered random number key code $I_d(D)$ is transmitted to the data deciphering apparatus 4 through the transmission line 3 (FIG. 4, S17).

In the called side, the ciphering key code $I_d(D)$ is supplied to the CPU 434 through the contact 411 of the relay (6), the transformer 481, the 2 line/4 line conversion circuit 482, the MODEM 49, the carrier signal detection circuit 431, and the communication module 432 (S100). The CPU 434 causes the ciphering key code $I_d$ preliminarily stored in the RAM (S101) to be read. The ciphered random number $I_d(D)$ is deciphered by the read ciphering key code $I_d$ to obtain the random number D (S102). The obtained random number D is temporarily stored in a RAM (S103).

In the system of FIG. 1, the circuit constituted by the data transmitting device, the telephone transmission line, and the data receiving device 5 is cut off only when the by-passing is carried out by the scramble portion 2E and the descramble portion in the case of data transmission. Before this cut-off, the above-mentioned circuit is operated in parallel with the data ciphering apparatus 2 and the data deciphering apparatus 4. In this case, the transmission and the reception of the control code is carried out in a similar manner as explained before. Even if the data is ciphered by the scramble portion 2E and the data is deciphered by the descramble portion 4E during the data transmission, the data transmitting device 1 and the data receiving device 5 themselves are not affected by such ciphering and deciphering. Therefore, it is possible to apply the data ciphering apparatus 2 and the data deciphering apparatus 4 not only to a new communication system to be constructed, but also to an existing communication system.

In order to apply the system of FIG. 1 to a bi-directional communication such as in a facsimile communication, a personal computer communication, and the like, a data deciphering apparatus 4' and a data ciphering apparatus 2' can be arranged in data transmitting-/receiving devices 1 and 5, respectively, as shown in broken lines in FIG. 1.

The systems of FIG. 1 and FIG. 6 can be applied not only to "one-to-one" data communication system but also various other data communication systems.

We claim:

1. An apparatus for ciphering data for use in a data communication system comprising;
   switching means adapted to be connected between a data transmitting device and a transmission line for switching the connection between said data transmitting device and said transmission line to enable an insertion of the ciphering apparatus between said data transmitting device and said transmission line;
line condition detector means connected with said switching means for detecting a call from said data transmitting device;
control code monitor means connected with said switching means for monitoring communication control codes from said data transmitting means;
scramble means connected with said switching means for scrambling data transmitted from said data transmitting device after the detection of the communication control codes by said control code monitor means; and
drive control means, connected with said switching means, for controlling transmission of scrambled data through said switching means from said transmitting device, said drive control means being associated with said switching means, said line condition detector means, said control code monitor means, and said ciphering means.

2. An apparatus according to claim 1, wherein said scrambling means comprises a key code inputting device for inputting key code.

3. An apparatus according to claim 2, wherein said scrambling means comprises a random number generator for generating a pseudo random number in response to a key code supply operation of said key code inputting device.

4. An apparatus for deciphering ciphered data for use in a data communication system comprising:
switching means adapted to be connected between a transmission line and a data receiving device for switching the connection between said transmission line and said data receiving device to enable an insertion of said deciphering apparatus between said transmission line and said data receiving device;
line condition detector means connected with said switching means for detecting a call transmitted through said transmission line;
control code monitor means connected with said switching means for monitoring communication control codes through said transmission line;
descramble means connected with said switching means for descrambling scrambled data transmitted through said transmission line after the detection of the communication control codes by said control code monitor means; and
drive control means, connected with said switching means and associated with said switching means, said line condition detector means, said control code monitor means, and said descrambling means, for receiving data and supplying said data receiving device through said switching means with deciphered data of received data transmitted through said transmission line.

5. A data communication system adaptable to a ciphered data communication comprising:
a data transmission line for transmitting ciphered or non-ciphered data between a data transmitting device and a data receiving device;
a data transmitting device for transmitting data;
a data receiving device for receiving data transmitted through said data transmitting device;
a data ciphering apparatus on the side of said data transmitting device; and
a data deciphering apparatus on the side of said data receiving device;
said data ciphering apparatus comprising: .
switching means between said data transmitting device and said data transmission line for switching the connection between said data transmitting device and said transmission line to enable an insertion of said ciphering apparatus between said data transmitting device and said transmission line;
line condition detector means connected with said switching means for detecting a call from said data transmitting device;
control code monitor means connected with said switching means for monitoring communication control codes from said data transmitting means;
scrambling means connected with said switching means for scrambling the data transmitted from said data transmitting device after the detection of the communication control codes by said control code monitor means; and
drive control means, connected with said switching means and associated with said switching means, said line condition detector means, said control code monitor means, and said scrambling means, for supplying said transmission line through said switching means with scrambled data of the data from said data transmitting device;
said data deciphering apparatus comprising:
switching means adapted to be connected between said transmission line and said data receiving device for switching the connection between said transmission line and said data receiving device to enable an insertion of said deciphering apparatus between said transmission line and said data receiving device;
line condition detector means connected with said switching means for detecting a call transmitted through said transmission line;
control code monitor means connected with said switching means for monitoring communication control codes through said transmission line;
descramble means connected with said switching means for descrambling scrambled data transmitted through said transmission line after the detection of the communication control codes by said control code monitor means; and
drive control means, connected with said switching means and associated with said switching means, said line condition detector means, said control code monitor means, and said descrambling means, for receiving data and supplying said data receiving device through said switching means with descrambled data of received data transmitted through said transmission line.

* * * * *

UNITED STATES PATENT AND TRADEMARK OFFICE
CERTIFICATE OF CORRECTION

PATENT NO. : 5,253,293
DATED : October 12, 1993
INVENTOR(S) : Mineo SHIGEMITSU et al It is certified that error appears in the above-indentified patent and that said Letters Patent is hereby corrected as shown below:

On the title page, Item [63], after "499,337," insert -- filed as PCT/JP89/00746 on July 26, 1989, published as WO90/06029 on --.

On the title page, Item [30], delete " Jan. 23, 1988 [JP] Japan ......63-11858 ".

Signed and Sealed this

Fourteenth Day of June, 1994

Attest:

BRUCE LEHMAN

Attesting Officer     Commissioner of Patents and Trademarks